(12) United States Patent
Olmino et al.

(10) Patent No.: US 9,201,771 B2
(45) Date of Patent: Dec. 1, 2015

(54) METHOD FOR EVALUATING A PRODUCTION RULE FOR A MEMORY MANAGEMENT ANALYSIS

(75) Inventors: Paolo Olmino, Genua (IT); Alessandro Raviola, Genua (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1502 days.

(21) Appl. No.: 12/547,524

(22) Filed: Aug. 26, 2009

(65) Prior Publication Data

US 2010/0057751 A1   Mar. 4, 2010

(30) Foreign Application Priority Data

Aug. 26, 2008   (EP) ..................... 08015029

(51) Int. Cl.
*G06F 17/30* (2006.01)
*G06F 11/36* (2006.01)

(52) U.S. Cl.
CPC ...... *G06F 11/3684* (2013.01); *G06F 17/30861* (2013.01)

(58) Field of Classification Search
CPC ................... G06F 17/30082; G06F 17/30215; G06F 17/30563; G06F 17/30864; G06F 17/30489; G06F 17/30551; G06F 17/30861
USPC .......... 707/688, 662, 758, 756, 711, 741, 769
See application file for complete search history.

(56) References Cited

U.S. PATENT DOCUMENTS

| | | | |
|---|---|---|---|
| 5,784,174 A * | 7/1998 | Fujino et al. | 358/404 |
| 2006/0184492 A1* | 8/2006 | Long et al. | 706/47 |
| 2006/0248103 A1 | 11/2006 | Belcher | |
| 2006/0277440 A1 | 12/2006 | Minshall et al. | |
| 2008/0126762 A1* | 5/2008 | Kelley et al. | 712/225 |
| 2009/0106353 A1* | 4/2009 | Belovich | 709/203 |
| 2010/0057751 A1* | 3/2010 | Olmino et al. | 707/10 |

OTHER PUBLICATIONS

Chernak, Y: "Validating and Improving Test-Case Effectiveness" Software Testing, IEEE Software Jan./Feb. 2001, pp. 81-86, XP002513170.
Wang, X, et al.: "An Effective Method to Detect Software Memory Leakage Leveraged from Neuroscience Principles Governing Human Memory Behavior", Computer Society, Proceedings of the 15th International Symposium on Software Reliability Engineering (ISSRE'04), 12 pages, XP 002513171.

* cited by examiner

*Primary Examiner* — Apu Mofiz
*Assistant Examiner* — Fariborz Khoshnoodi
(74) *Attorney, Agent, or Firm* — Laurence Greenberg; Werner Stemer; Ralph Locher

(57) ABSTRACT

A method for evaluating a production rule for usage as a test input process for a memory management analysis is carried out via a server process. The server process accesses at least a database of a manufacturing execution system. At least one user table is retrieved out of the database. A first number of records are retrieved for the user table. A single execution of the production rule is triggered by the server process. A second number of records are retrieved for the user table. The first number of records are compared to the second number of records and either, classifying the production rule as a suitable rule for the memory management analysis if the first and the second number of records are equal, or, classifying the production rule as an unsuitable rule for the memory management analysis if the first and the second number records are unequal.

7 Claims, 2 Drawing Sheets

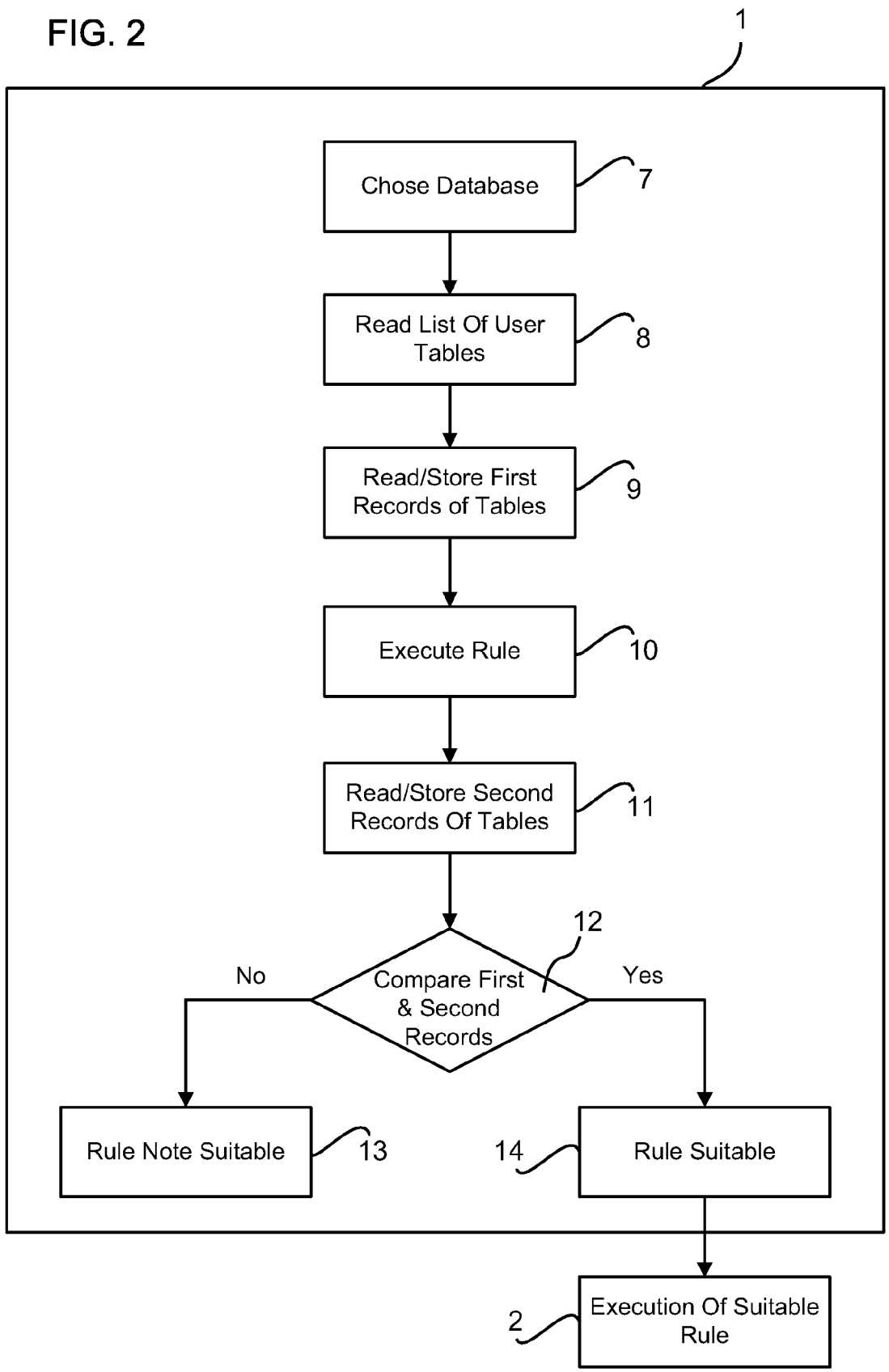

METHOD FOR EVALUATING A PRODUCTION RULE FOR A MEMORY MANAGEMENT ANALYSIS

CROSS-REFERENCE TO RELATED APPLICATION

This application claims the priority, under 35 U.S.C. § 119, of European application EP 08 015 029.5, filed Aug. 26, 2008; the prior application is herewith incorporated by reference in its entirety.

BACKGROUND OF THE INVENTION

1. Field of the Invention

The invention relates to a method for evaluating a production rule, the production rule being used especially as a test input process for a memory management analysis of a server.

Server processes used to manage client requests must have particular characteristics in order to ensure at least a stability of a system. Furthermore they have to be optimized in terms of speed and responsiveness to the requests of clients. During their development, the server processes have to undergo several thorough tests in order to ensure the above mentioned characteristics. Particularly, one critical issue in a test phase is memory management behaviour of each server process. Thus, a memory management analysis has to be carried out in order to evaluate a performance of a server process. The memory management analysis consists in monitoring a totality of private bytes of the process, in other words an entire memory space of the process. This monitoring aims to find out if the number of private bytes steadily increases or if a nearly constant number of bytes is present. In case the number steadily increases, it is a sign that there may be problems in the design of the process such that memory leaks are generated. Memory leaks are a common problem in software design arising from allocation of memory chunks for the process and failure to deallocate or release the memory chunks as soon as they are no longer needed. This problem is particularly severe in the frequent case that the process is called several times or in defined time periods within a session. This results in the steady increase of the private bytes of the process and in the worst case in a complete memory lock, the later further resulting in a collapse of an entire underlying system wherein the process is running.

The memory management analysis and eventually a resulting resolution of memory leak problems avoid a system or a process crash due to full system memory. The analysis of the private bytes of the process is a quite complicated task because the memory management of the process's memory depends on several parameters like the process itself, an operating system, a framework used for the process, etc. Especially in manufacturing execution systems, the memory management analysis also depends on a quality of tests performed, for example a specification of a sufficient period of time the test has to run in order to gather enough information about memory behaviour. Furthermore, the quality of the test input process or the production rule, modules and parameters is very important in order to avoid erroneous conclusions from the analysis. For example, a production rule itself may induce memory leaks into the system. Another example is an inappropriate production rule which, by its intended behaviour, will increase memory consumption due to internal algorithms which are correct. This increase in memory consumption could lead to misinterpretation of a result of the analysis, suggesting memory leaks where in reality no memory leaks are present.

Thus, in order to reach a correct and accurate evaluation of a memory management analysis, an operator has to exclude all possibilities of errors outside of the server process to be tested. In manufacturing execution systems, the test input process is a production rule characterizing steps to be taken in a certain order within a manufacturing process. The production rule includes data manipulation within the production process by retrieving information from a database for example about a status of a sensor. The database is located in a central server and is accessed by several clients residing in different areas of a production site by an internal network. The server process is responsible for a management of data requests from all clients. In order to perform the memory management analysis for the server process, at least one production rule has to be run on the server in order to monitor the memory space behaviour over a certain period of time.

Especially in manufacturing execution systems, the client requests may represent very complicated production rules because of hundreds of possible different types of calls. Furthermore, many production rules make calls to other procedures, as a consequence further augmenting the complexity. Thus, for the memory trend analysis, this complexity makes it necessary to spend a considerable amount of time in order to sort the different type of calls and identify possible memory leaks.

In order to ensure a reliable memory management analysis and to simplify a process of searching errors, it is necessary to understand which production rules are suitable for the analysis, thus, the at least one production rule has to be evaluated in order to ensure its suitability for the analysis.

One goal to be achieved is to be seen in providing a method for evaluating a production rule, aiming to determine a usability of the production rule as a test input process for the memory management analysis of the server process.

SUMMARY OF THE INVENTION

It is accordingly an object of the invention to provide a method for evaluating a production rule for a memory management analysis that overcome the above-mentioned disadvantages of the prior art methods and devices of this general type.

The goal is achieved according to the present invention by a method for evaluating a production rule in terms of a suitability of the production rule for usage as a test input process for a memory management analysis carried out to a server process running on a server. The server process accesses at least one database of a manufacturing execution system. In the method, at least one user table is retrieved out of the database by analyzing at least one system table of the database. A first number of records are retrieved for the user table. A single execution of the production rule is triggered by the server process. A second number of records are retrieved for the user table. The first number of records are compared to the second number of records and either classifying the production rule as a suitable rule for the memory management analysis in the case where the first and the second number of records are equal, or, classifying the production rule as an unsuitable rule for the memory management analysis in the case where the first and the second number of records are unequal.

The main advantage of the present invention is an elimination of possible errors in an interpretation of the memory management analysis due to improper test input processes. Another advantage is a considerable simplification of the memory management analysis itself by reducing error analysis effort.

In accordance with an added mode of the invention, there is the step of serially evaluating each one of multiple production rules in a user defined test order.

In accordance with an additional mode of the invention, there is the step of invoking the server process by means of an inter-process communication procedure.

In accordance with a further mode of the invention, there is the step of invoking a server internal database accessing process by means of the inter-process communication.

In accordance with an another mode of the invention, there is the step of performing the inter-process communication via a data communication interface from a remote client.

In accordance with a concomitant mode of the invention, there is the step of triggering the memory management analysis if the suitable rule has been identified.

Other features which are considered as characteristic for the invention are set forth in the appended claims.

Although the invention is illustrated and described herein as embodied in a method for evaluating a production rule for a memory management analysis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a flow chart of the method for evaluating a production rule.

DETAILED DESCRIPTION OF THE INVENTION

Figure 1:
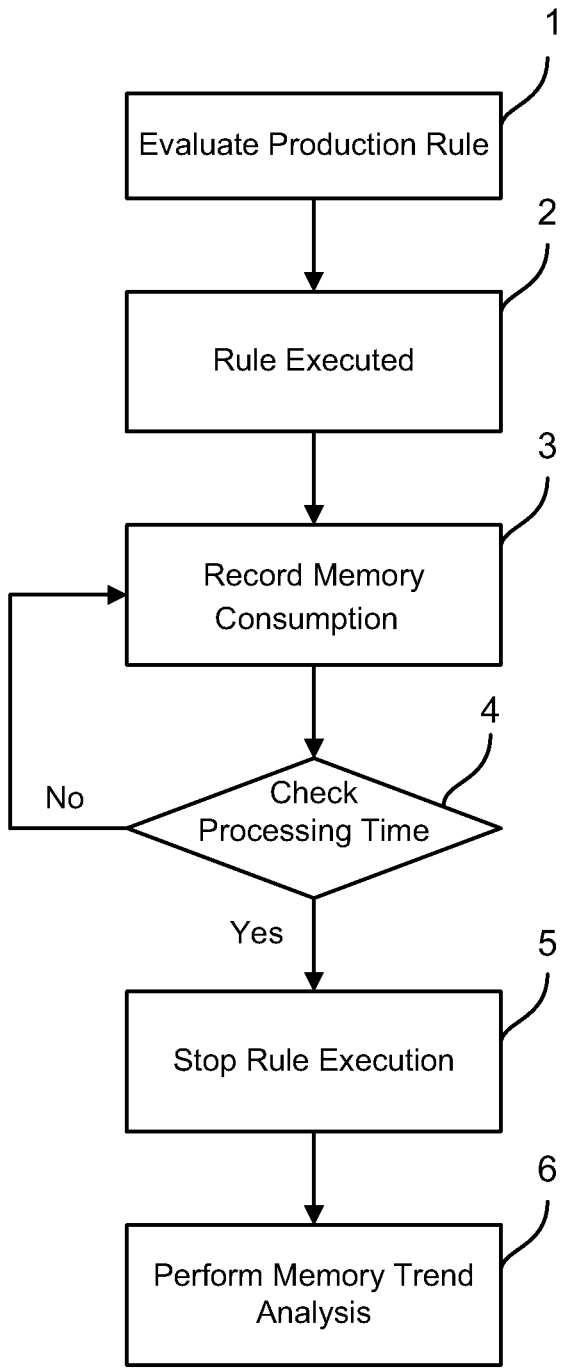
FIG. 1 is a flow chart for describing a method for memory management analysis according to the invention.

Referring now to the drawings of the invention in detail, and in particular to FIG. 1 thereof, there is shown an example of a method for carrying out a memory management analysis. After a production rule to be used as the test input process has been chosen by an operator, the production rule is evaluated 1 in order to find out if it is suitable for the analysis. If the production rule is suitable, the rule is executed 2 on the server by a server process. Then, server process memory consumption is recorded 3. In a next step it is checked 4 if a processing time is enough for a reliable result of the analysis. As long as the processing time is not long enough, the rule is executed 2 again. As soon as the processing time has been identified to be long enough, the rule execution is stopped 5 and a memory trend analysis 6 is carried out, thus the memory consumption monitored throughout all executions of the rule is being analyzed.

FIG. 2 shows in detail an example of the evaluation 1 of the production rule from FIG. 1. First, a database is chosen 7. Then a list of all user tables is read 8 from at least one system table of the database. In a subsequent step, a first number of records for each user table is being read and stored 9. Subsequently, the production rule is executed once 10 and a second number of records for each user table is read and stored 11. In yet a next step, the first number of records is compared 12 with the second number of records. If the first and the second number of records are unequal, the rule is unsuitable for the analysis 13 and the evaluation returns without triggering a memory management analysis. If the first and the second number of records are equal for each of the user tables, the production rule is suitable 14 for using it as an input test process for the memory management analysis and the suitable rule is passed on to the memory management analysis for execution 2.

Each one of multiple production rules are serially evaluated in a user defined test order. This advantageously allows an operator to test multiple production rules in one step. A further advantage is the possibility to evaluate more complicated scenarios, whereby an entire production process can be checked by taking into account all production rules associated with the production process.

The server process is invoked by an inter-process communication procedure. This advantageously increases a flexibility of the method by standardizing an interface able to communicate with different server processes.

A server internal database accessing process is invoked by the inter-process communication. Preferably, the server internal database accessing process is a sub-process of the server process undergoing the memory management analysis. All database access instructions required by the suitable rule is thus handled by the server process, allowing a handling of server internal database management independently of the production rule. Furthermore, the inter-process communication is done via a data communication interface from a remote client. This advantageously decouples the evaluation of the rule from the server internal database management. A further advantage is the possibility to evaluate a production rule in a location-independent way. For example, the operator is able to trigger the evaluation from a different site than a server's location.

The memory management analysis is triggered in case the suitable rule has been identified. In order to automate the memory management analysis, the method according to the present invention only passes a suitable rule for usage as the test input process to the analysis. In case an unsuitable rule has been identified, a triggering of the analysis is avoided.

A module implements the method by using software code, whereby the module contains a user interface, a data communication interface and a data evaluation entity. The user interface allows an input of parameters of the production rule to test, of the multiple production rules and the user defined test order. Furthermore, it outputs results of the evaluation. For example, if the production rule is identified as an unsuitable rule, the operator is notified that the memory management analysis has been skipped. The data communication interface allows a remote triggering of the evaluation, for example from a client terminal. The data evaluation entity is responsible for gathering and interpreting the results of the evaluation and, in case an automatic memory management analysis had previously been triggered due to an identification of the production rule as the suitable rule, also for gathering and interpreting a result of the memory management analysis.

The invention claimed is:

1. A method for evaluating a production rule in terms of suitability of the production rule for usage as a test input process for a memory management analysis carried out via a server process running on a server, the server process accessing at least one database of a manufacturing execution system, which comprises the steps of:

retrieving at least one user table out of the database by analyzing at least one system table of the database;

retrieving a first number of records for the user table;

triggering a single execution of the production rule by the server process;

retrieving a second number of records for the user table;

comparing the first number of records to the second number of records;

classifying the production rule as a suitable rule for the memory management analysis if the first and the second number of records are equal; and classifying the production rule as an unsuitable rule for the memory management analysis if the first and the second number records are unequal.

2. The method according to claim 1, which further comprises serially evaluating each one of multiple production rules in a user defined test order.

3. The method according to claim 1, which further comprises invoking the server process by means of an inter-process communication procedure.

4. The method according to claim 3, which further comprises invoking a server internal database accessing process by means of the inter-process communication.

5. The method according to claim 3, which further comprises performing the inter-process communication via a data communication interface from a remote client.

6. The method according to claim 1, which further comprises triggering the memory management analysis if the suitable rule has been identified.

7. A module, comprising:
a user interface;
a data communication interface;
a data evaluation entity; and
the module evaluating a production rule in terms of suitability of the production rule for usage as a test input process for a memory management analysis carried out via a server process running on a server, the server process accessing at least one database of a manufacturing execution system, the module being programmed to:
retrieve at least one user table out of the database by analyzing at least one system table of the database;
retrieve a first number of records for the user table;
trigger a single execution of the production rule by the server process;
retrieve a second number of records for the user table;
compare the first number of records to the second number of records;
classify the production rule as a suitable rule for the memory management analysis if the first and the second number of records are equal; and
classify the production rule as an unsuitable rule for the memory management analysis if the first and the second number records are unequal.

* * * * *